(12) United States Patent
Maeda et al.

(10) Patent No.: US 6,334,659 B1
(45) Date of Patent: Jan. 1, 2002

(54) PRINTING APPARATUS AND PRINTING METHOD

(75) Inventors: Tetsuhiro Maeda, Kawasaki; Hiroshi Tajika, Yokohama; Miyuki Fujita, Tokyo; Yuji Konno, Kawasaki; Norihiro Kawatoko, Kawasaki; Tetsuya Edamura, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,292

(22) Filed: Jul. 7, 2000

(30) Foreign Application Priority Data

Jul. 9, 1999 (JP) .................................. 11-196568

(51) Int. Cl.[7] .............................. B41J 29/38; B41J 2/145; B41J 2/15
(52) U.S. Cl. ................................. 347/12; 347/16; 347/41
(58) Field of Search ................................. 347/41, 12, 16, 347/9

(56) References Cited

U.S. PATENT DOCUMENTS

| 6,089,697 A | 7/2000 | Tajika et al. .................... 347/43 |
| 6,099,116 A | 8/2000 | Fujita et al. ................... 347/101 |
| 6,250,737 B1 * | 6/2001 | Matsubara et al. ............ 347/40 |

* cited by examiner

Primary Examiner—Thinh Nguyen
(74) Attorney, Agent, or Firm—Fitzpatrick, Cella, Harper & Scinto

(57) ABSTRACT

By performing printing by a reduced number of main scanning times and by a bind pitch of a period which is imperceptible to human vision, a printing apparatus and a printing method for forming an image of visually imperceptible banding artifacts is provided. For this purpose, in a printing apparatus wherein a printing head is scanned for a plurality of times in a main scanning direction and at each scanning the printing head is divided into a plurality of blocks and printing is made to a region corresponding to each of the blocks by multi-scanning printing, the region is formed by printing one divided region in each of the plurality of scans in a transporting direction.

26 Claims, 15 Drawing Sheets

PAPER TRANSPORTING:
4-NOZZLE TRANSPORTING

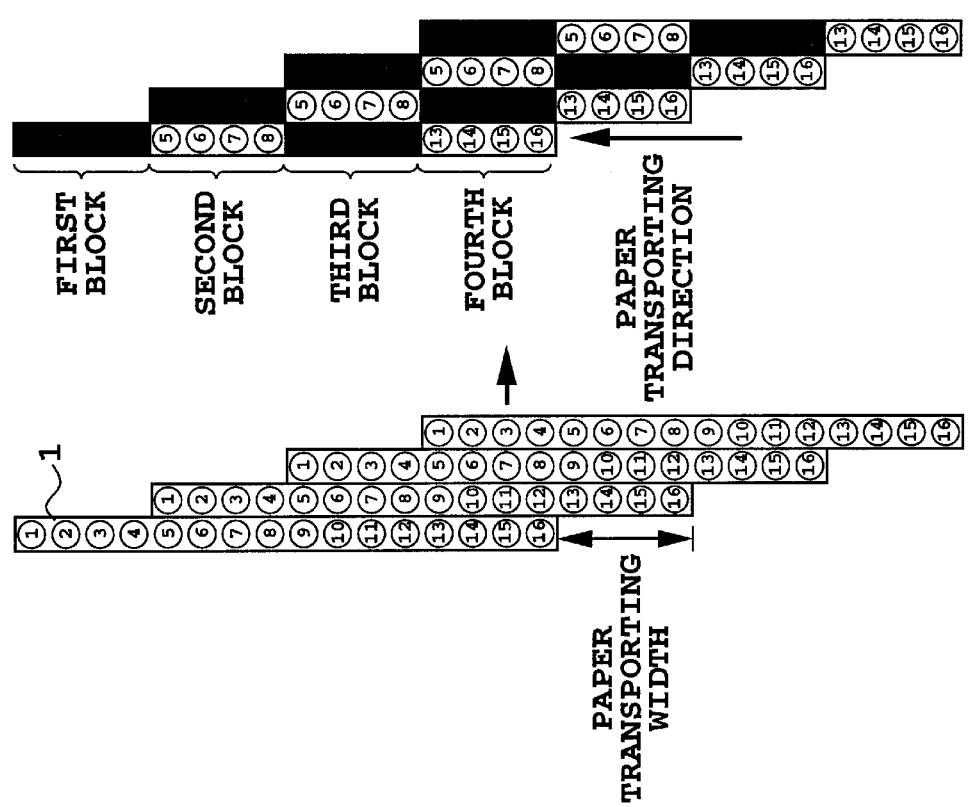

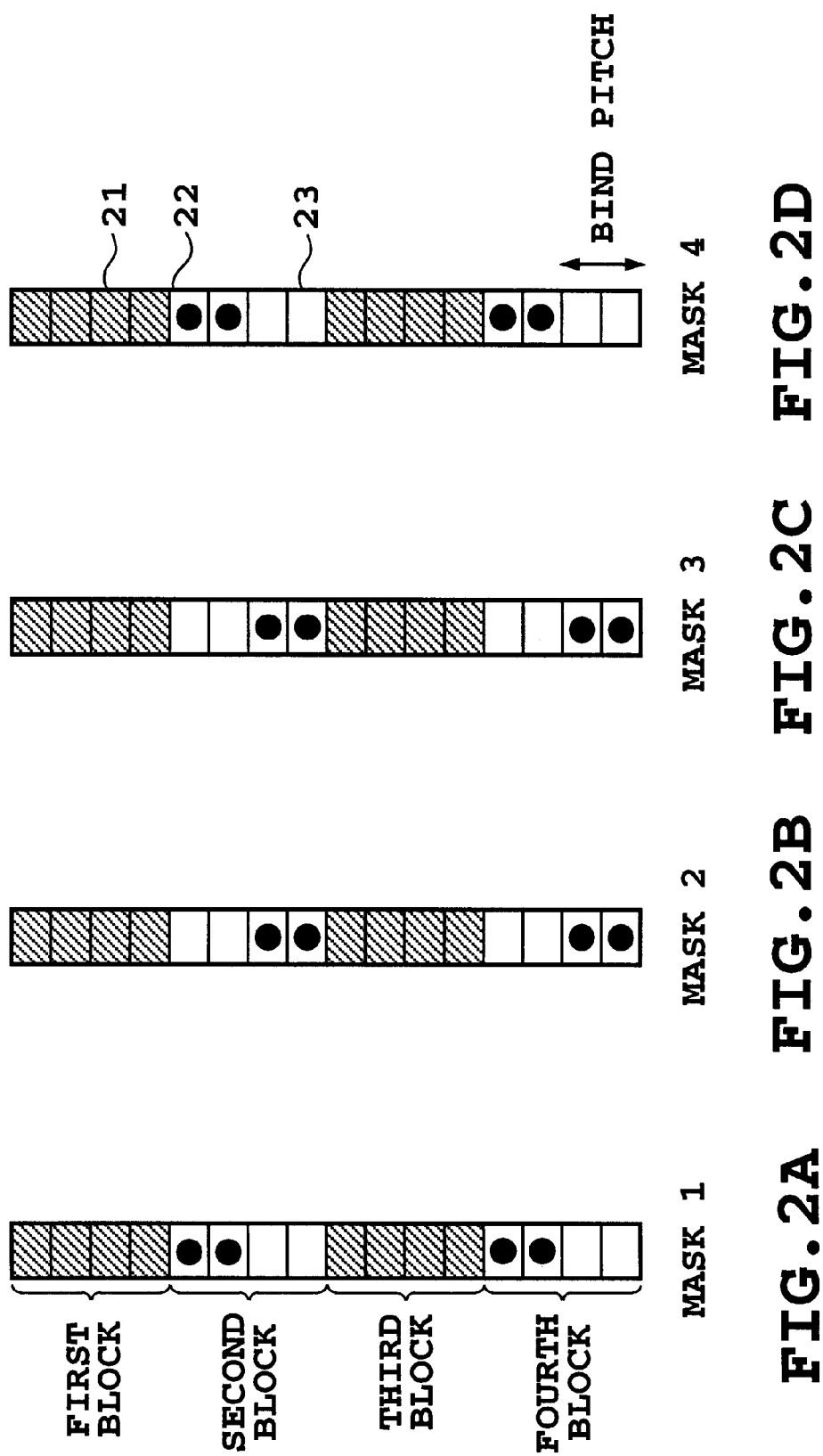

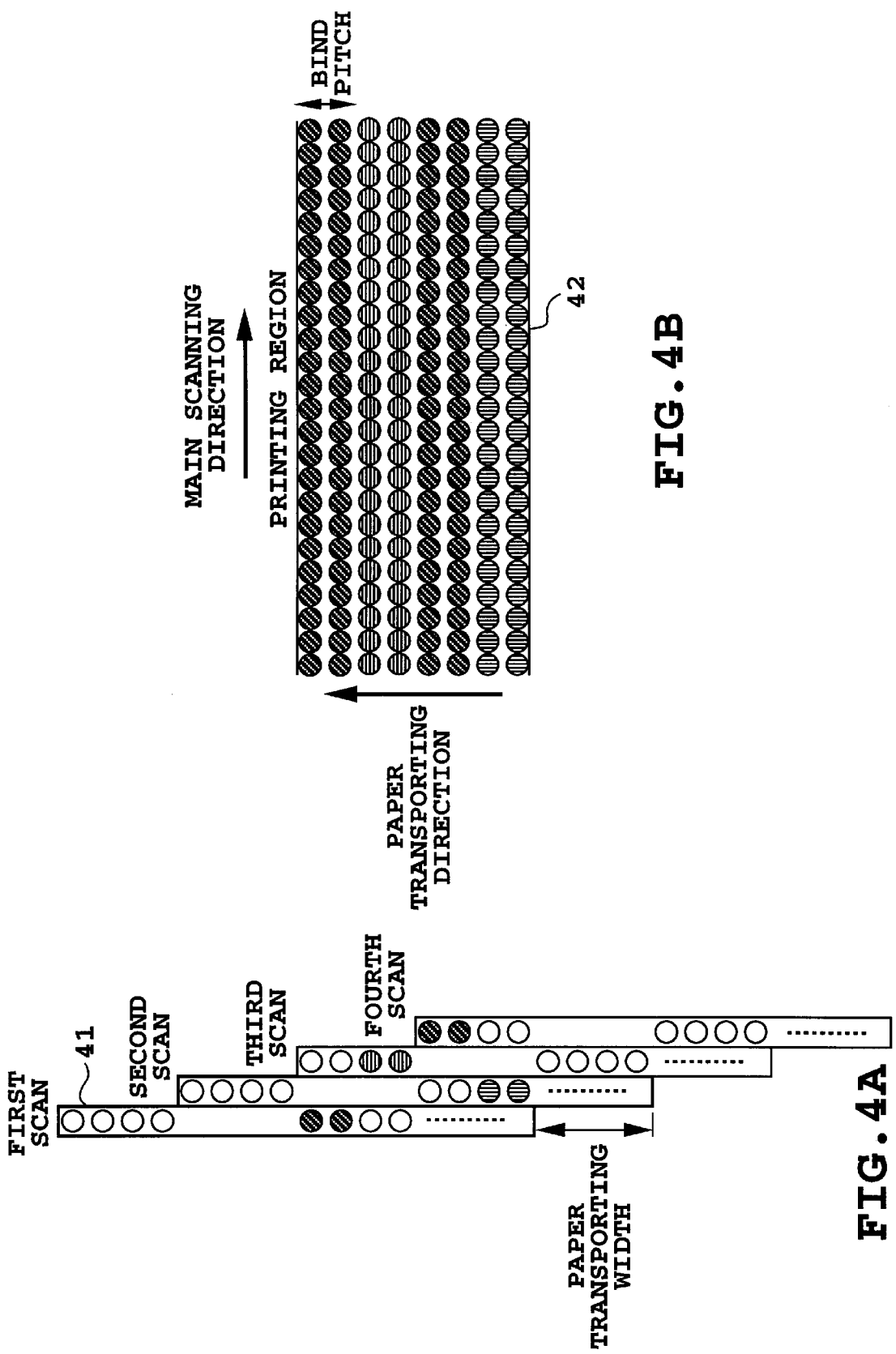

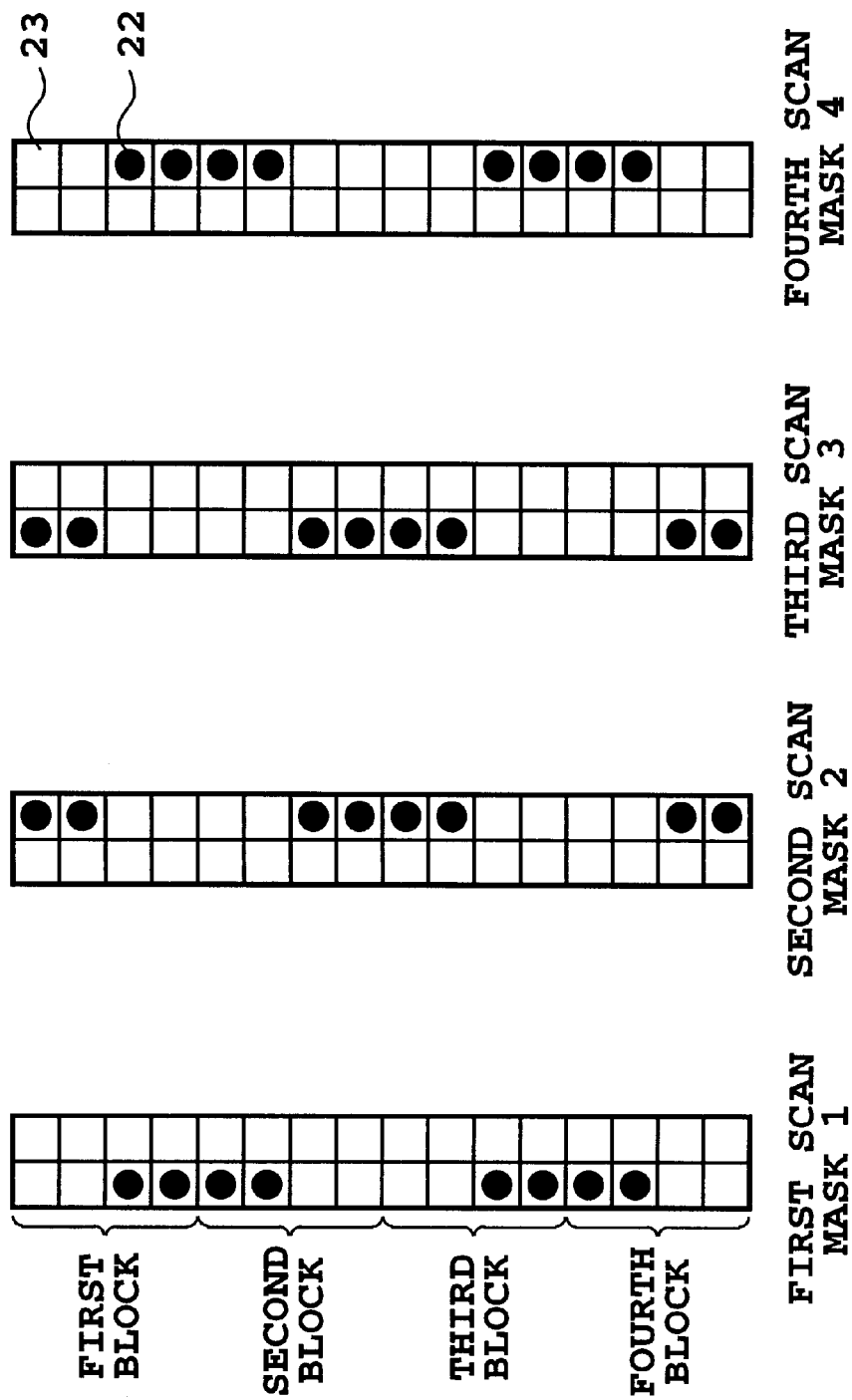

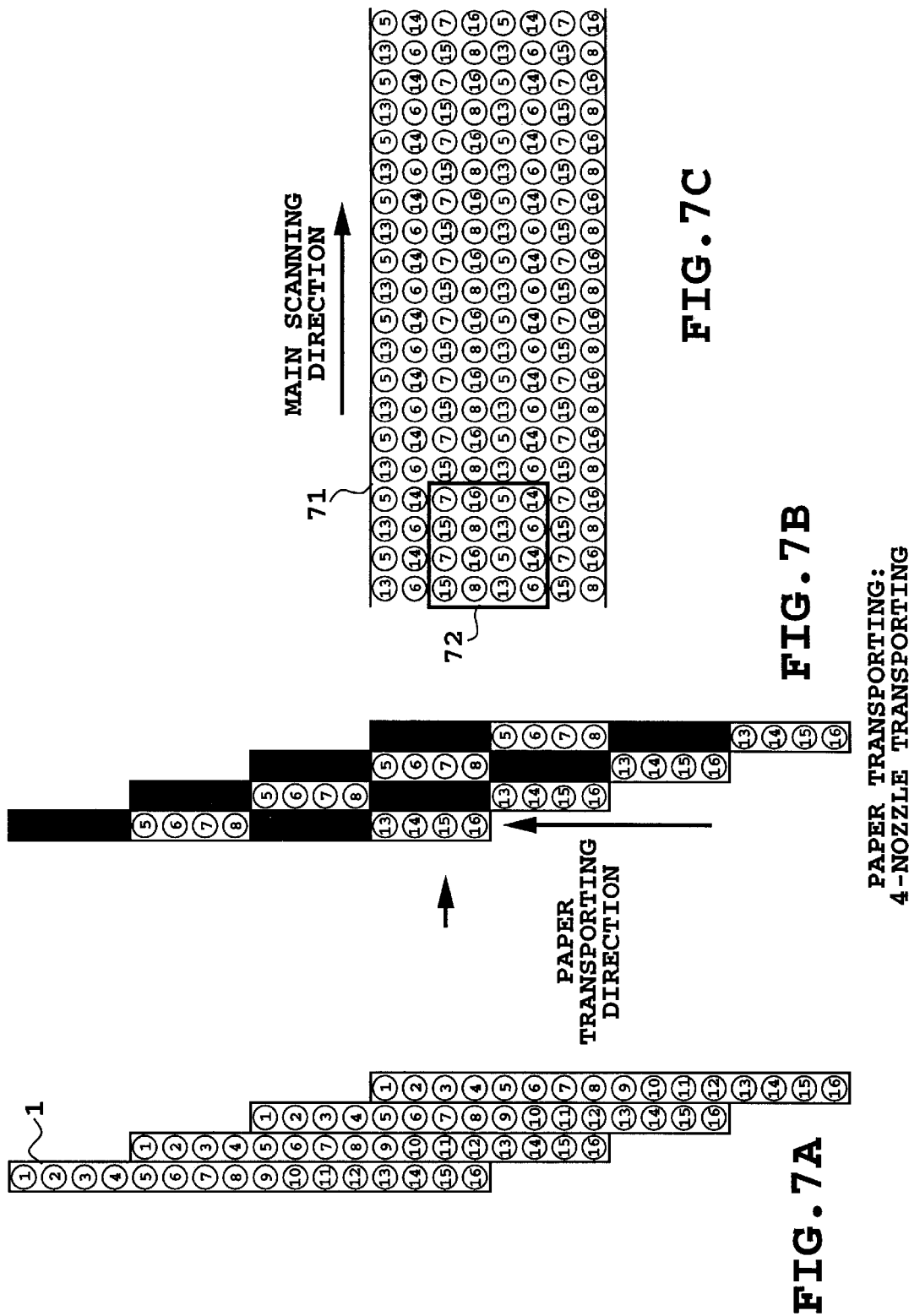

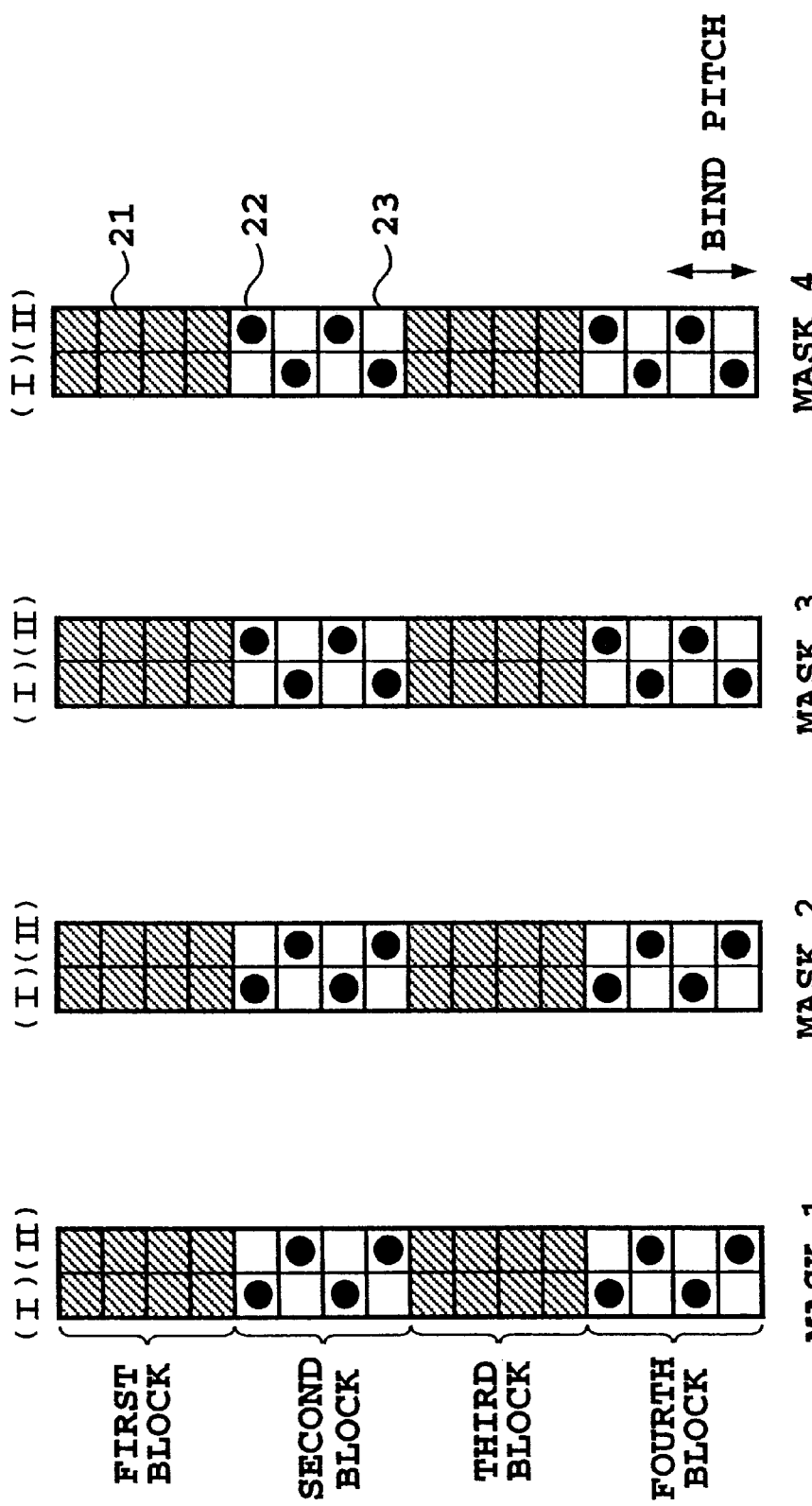

FIRST PRINTING SCAN

SECOND PRINTING SCAN

THIRD PRINTING SCAN

FOURTH PRINTING SCAN

PRINTING APPARATUS AND PRINTING METHOD

This application is based on Japanese Patent Application No. 11-196568 (1999) filed Jul. 9, 1999, the content of which is incorporated hereinto by reference.

BACKGROUND OF THE INVENTION

1. Field of the Invention

The present invention relates to a printing apparatus and a printing method, more specifically to a printing apparatus and a printing method in which a printing head provided with a printing element arrangement of a plurality of printing elements is scanned in a direction different from the above arrangement direction relative to the printing medium, and printing medium (such as paper) transporting of less than the range of the arrangement is performed between respective scans.

2. Description of the Related Art

A so-called serial printer is popularly used, which has a printing element arrangement of a plurality of printing elements arranged in a printing head, and during printing, the printing head is scanned relative to a printing medium to perform printing.

Such printing apparatus can be divided by the printing method into an ink-jet type, a wire dot type, a thermal transfer type, an electro-photographic type and the like. Among these, the ink-jet type printing apparatus ejects ink drops from an ejection opening to the printing medium to perform printing. As the ink ejection method, a bubble jet type, a piezoelectric type or the like is used. In a bubble jet type, an electro-thermal converting element as a thermal energy generation element is provided in an ink passage in the vicinity of the ejection opening, the electro-thermal converting element is driven to cause film boiling of ink in the ink passage, and the ink drop is ejected by a pressure of bubble generated at that time. In the piezoelectric type a piezoelectric element is used as an ejection energy generation element to eject ink utilizing a pressure generated when the piezoelectric element is deformed.

When performing printing by using a printing head having a plurality of printing elements as the above-described ejection openings, quality of the printed image greatly depends on the performance of the single printing head.

For example, in the case of an ink jet type printing head, due to slight differences generated in the printing head manufacturing process, such as deviation of shape of each ejection opening or deviation of formation position of the electro-thermal converting element, ejection amount and ejection direction and the like may be slightly varied between respective printing elements. As a result, differences may be generated such as generation of minute deviation of respective deposition positions of ink drops ejected from respective ejection openings, or variation in formed dot size. This leads to generation of density irregularity or unevenness such as stripes in the image, resulting in deterioration of image quality.

It is known that such deviation in printing characteristics by printing elements is not limited to the ink jet type printing head, but may occur in printing heads of other types.

In order to prevent density variation causing deterioration of image quality, it is proposed to reduce deviation of respective printing characteristics to respective printing elements, for example, using a method in which the same part of the printing medium is scanned for a plurality of times to complete an image, that is, a so-called multi-scanning or multi-pass printing method.

That is, in ordinary printing method, after a printing by scanning the printing head one time, paper is transported by the width of the printing head, and printing of the next region is made. Therefore, the same region of the printing medium is never scanned for a plurality of times by the printing head. Consequently, for example, when there is a deviation in printing characteristic per every printing element, the deviation appears, as is, as density irregularity in the image.

In the multi-scanning printing method, on the other hand, the printing head is divided into a plurality of blocks each of which has several printing elements, and paper transporting is performed according to a width of the divided one block, and the same region of the printing medium is scanned by the printing head for a plurality of times, and at every scanning, the printing elements of different blocks are driven. For example, as shown in FIGS. 12A and 12B, when sixteen printing elements of the printing head are divided into four blocks, the same region is scanned four times to complete the image. Therefore, even when there is deviation in printing characteristics among respective printing elements, printing elements for printing each region are dispersed, influence of difference in printing characteristics on respective regions are reduced, and density unevenness becomes inconspicuous.

As described above, by the multi-scanning printing method, density unevenness due to deviation of printing characteristic among printing elements in the printing head can be reduced in units of scanning regions of the printing head.

However, there may be a case where the printed image differs in density and tint between scanning regions of the printing head. As a result, stripes (hereinafter referred also to as "banding artifacts") are generated with a period of the width of the scanning region over the entire image, resulting in deterioration of image quality.

One of the major causes of difference in density between scanning regions is due to the order of printing on scanning, when printing is completed by performing scanning of a plurality of times in each region.

For example, in divided printing such as the multi-scanning printing method, in a method where so-called bi-directional printing is effected, density slightly differs between the region printed first by forward scanning and the region printed first by backward scanning, and banding artifacts may occur. In the example shown in FIG. 12B, density differs in respective scanning regions a, b and c, which appear as banding artifacts.

In particular, when performing color printing by depositing ink drops of respective colors overlappingly, the overlapping order of respective color inks differs because of the above bi-directional printing, and banding artifacts are liable to occur.

That is, when ink of a different color is ejected overlappingly on the formerly deposited ink, in the overlapping part, the later deposited ink tends to sink in a depth direction of the paper surface. This phenomenon generates because bonding of the printing medium and dyestuff is limited. That is, because bonding of the dyestuff of the formerly deposited ink and the printing medium has preference, the dyestuff of the latterly deposited ink is difficult to bond on the surface of the printing medium, and sinks in the depth direction of the paper surface. As a result, even when printing of a predetermined color is performed by overlapping inks of the same color set, because the overlapping order differs between scanning regions, differences in density or tints are generated, and the above banding artifacts may occur.

A method is proposed as a measure against the above banding artifacts, for example, in the multi-scanning printing method, by increasing the number of division, the formed bind pitch (period of density unevenness) is shortened to make the stripes imperceptible to human eyes, thereby making banding artifacts inconspicuous.

However, in this method, the paper transporting width at a time is reduced, the number of scanning times is increased, and the time required for the entire printing becomes long, which impedes high-speed printing.

SUMMARY OF THE INVENTION

An object of the present invention is to provide a printing apparatus and printing method for forming an image of inconspicuous banding artifacts by performing printing by a reduced number of scanning times and by a bind pitch of a period which is imperceptible to human eyes.

In the first aspect of the present invention, there is provided a printing apparatus for performing printing using a printing head having a plurality of printing elements arranged thereon, comprising:

scan means for scanning the printing head relative to a printing medium in a direction different from the arrangement direction of the printing elements;

transport means for transporting the printing medium relative to the printing head by an amount corresponding to a printing element arrangement length in a block of printing elements, the length being obtained by dividing the plurality of printing elements into a plurality of blocks; and control means for controlling the scan means to perform scanning of a plurality of times and interposing the transporting by the transport means between each scanning, and for completing printing on a region of the printing medium corresponding to the respective plurality of blocks, wherein the control means controls a printing operation on a partial region as a part of the region in the transporting direction in each scanning of the plurality of times, and completes the printing of the region corresponding to the printing element arrangement length in the block.

In the second aspect of the present invention, there is provided a printing method for performing printing using a printing head having a plurality of printing elements arranged thereon, comprising:

a scan step of scanning the printing head relative to a printing medium in a direction different from the arrangement direction of the printing elements;

a transport step of transporting the printing medium relative to the printing head by an amount corresponding to a printing element arrangement length in a block of printing elements, the length being obtained by dividing the plurality of printing elements into a plurality of blocks; and a control step of controlling the scan step to perform scanning of a plurality of times and interposing the transporting in the transport step between each scanning, and of completing printing on a region of the printing medium corresponding to the respective plurality of blocks, wherein the control step controls a printing operation on a partial region as a part of the region in the transporting direction in each scanning of the plurality of times, and completes the printing of the region corresponding to the printing element arrangement length in the block.

With the above construction, since printing elements for performing printing of one scan in one block are only part of the region, formed bind pitch is reduced to less than paper transport width, and only the bind pitch can be reduced without increasing the number of scans. Therefore, when the bind pitch is set to less than sight characteristic, banding artifacts are imperceptible.

The above and other objects, effects, features, and advantages of the present invention will become more apparent from the following description of embodiments thereof taken in conjunction with the accompanying drawings.

BRIEF DESCRIPTION OF THE DRAWINGS

FIGS. 1A to 1C are schematic views showing a printing head, a driving method thereof, and a printing result on the printing medium in a first embodiment of the present invention;

FIGS. 2A to 2D are views showing mask patterns used in the first embodiment;

FIGS. 4A and 4B are views respectively showing printing head driving methods and a printing result on the printing medium in the second embodiment of the present invention;

FIGS. 6A to 6D are views showing mask patterns used in the third embodiment;

FIGS. 7A to 7C schematic views showing a printing head, a driving method thereof, and a printing result on the printing medium in a fourth embodiment of the present invention;

FIGS. 8A to 8D are views showing mask patterns used in the fourth embodiment;

DETAILED DESCRIPTION OF PREFERRED EMBODIMENTS

Embodiments to which the printing apparatus and printing method according to the present invention are applied will be described in the following with reference to the drawings.

(1.1) Mechanical Constitution

Figure 13:
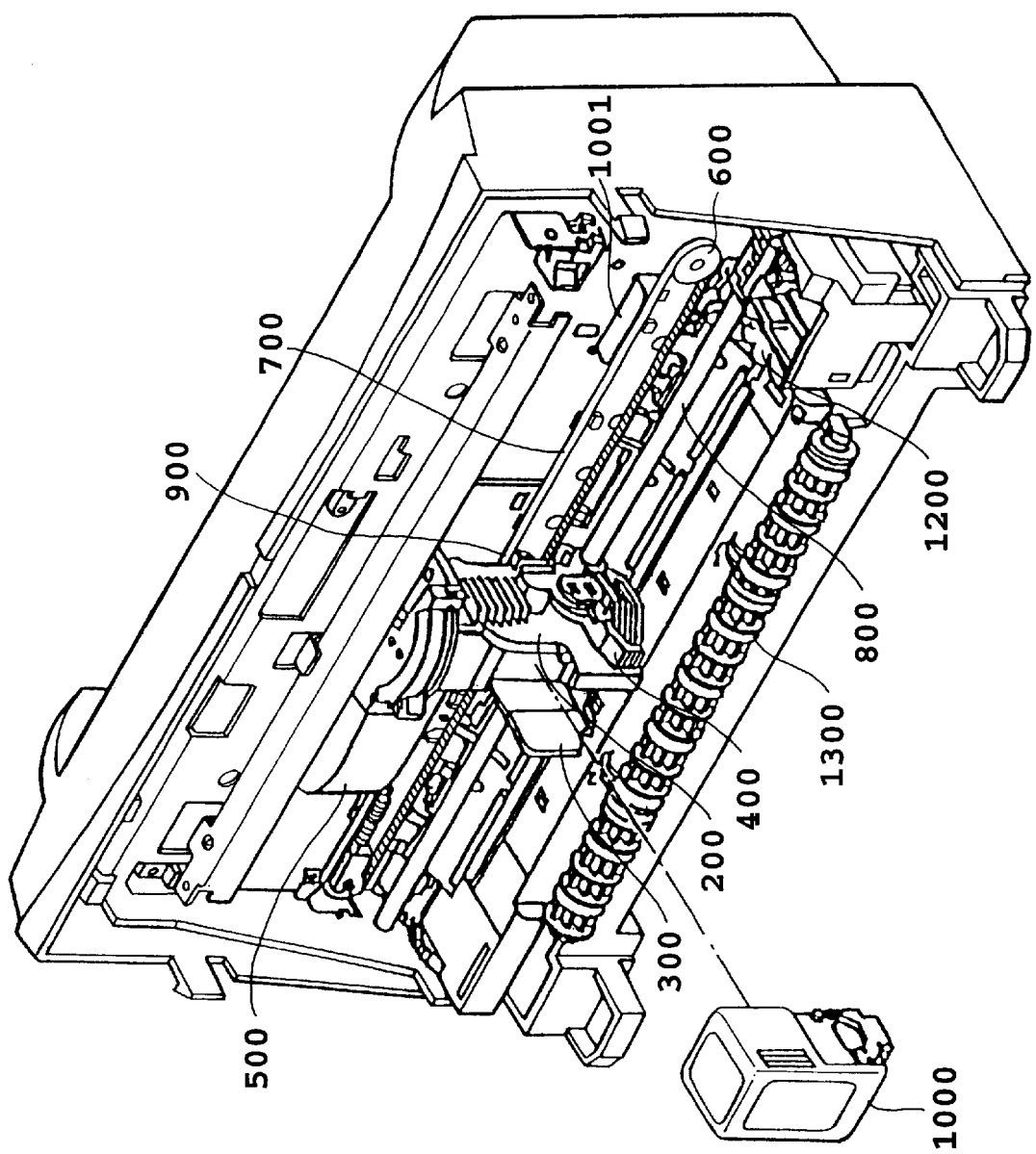
FIG. 13 is a perspective diagram of the printing apparatus applied to the present invention.

FIG. 13 is a perspective view showing a constitution example of a printing apparatus which the invention is preferably embodied or to which is preferably applied and in the drawing, a condition that, detaching the front cover, an inside of an apparatus is exposed is shown.

In the drawing, a reference numeral 1000 denotes an exchangeable type head cartridge and a reference numeral 200 denotes a carriage unit retaining the head cartridge detachably. A reference numeral 300 denotes a holder for fixing the head cartridge 1000 on the carriage unit 200. After the head cartridge 1000 has been installed within the carriage unit 200, the cartridge fixing lever 400 is operated, and linking to this operation, the head cartridge 1000 is contacted with the carriage unit 200. Moreover, when the head cartridge 1000 is located by the contacting, electric contacts for the required signal transmission, which are provided on the carriage unit 200, are in contact with electric contacts on the side of the head cartridge 1000. A reference numeral 500 denotes a flexible cable for transferring electric signals to the carriage unit 200.

A reference numeral 600 denotes a carriage motor as a driving source for allowing the carriage unit 200 to travel in the direction of the main scanning reciprocally, and a reference numeral 700 denotes a carriage belt transmitting the driving force to the carriage unit 200. A reference numeral 800 denotes a guide shaft extending in the main scanning direction for supporting and guiding the carriage unit 200.

A reference numeral 900 denotes a transparent-type photo coupler attached to the carriage unit 200, and a reference numeral 1001 denotes a light shielding plate provided in the vicinity of the carriage home position. When the carriage unit 200 reaches the home position, the light shielding plate 1001 shields a light axis of the photo coupler 900 to detect the carriage home position. A reference numeral 1200 denotes a home position unit including a recovery system such as a cap member for capping a front face of the ink jet head, suction means for sucking from the inside of this cap and further a member for wiping the front face of the head.

A reference numeral 1300 denotes a discharge roller for discharging the printing medium. The discharge roller sandwiches the printing medium, cooperating with a spur-shaped roller (not shown) to discharge this out of the printing apparatus. Although not shown FIG. 13, a line transport unit to transport the printing medium in the sub scanning direction by the predetermined amount between each scanning of carriage unit 200 in the main scanning direction is provided.

Figures 14A, 14B:
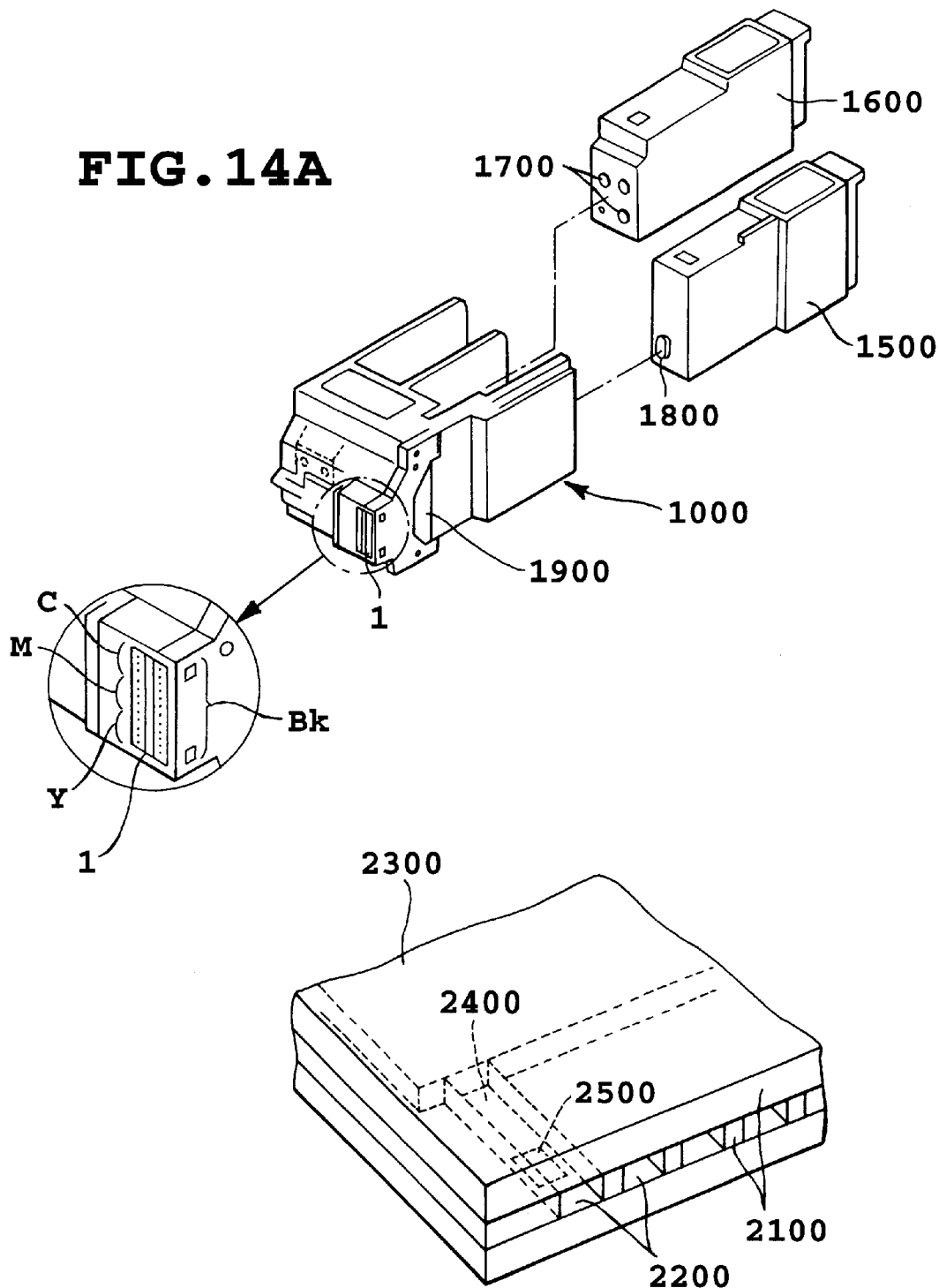
FIGS. 14A and 14B are respectively an exploded perspective view and a partial perspective diagram of the printing head.

FIG. 14A is a perspective view showing a detail of a head cartridge 1000 shown in FIG. 13. Here, a reference numeral 1500 denotes an ink tank accommodating black ink, and a reference numeral 1600 denotes an ink tank accommodating a cyan, a magenta and a yellow ink. These tanks are designed to be able to attach and detach to and from the head cartridge body. Each of portions denoted with reference numeral 1700 is a coupling port for each of ink supply pipes 2000 on the side of the head cartridge of the ink tank 1600 accommodating each color ink. Similarly, a reference numeral 1800 is a coupling port for the black ink accommodated in the ink tank 1500. And by this coupling, the ink can be supplied to the printing head 1 which is retained in the head cartridge body. A reference numeral 1900 denotes an electric contact section, and via contact with an electric contact section provided on the carriage unit 200, electric signals from control section of the body of the printing apparatus can be received through a flexible cable.

In this embodiment, a head in which both a black ink ejecting portion arranging nozzles for ejecting the black ink and a color ink ejecting portion are arranged in parallel is used.

FIG. 14B is a schematic perspective view partially showing a structure of a main portion of the printing head portion 1 of the head cartridge 1000.

In FIG. 14B, a plurality of ejection openings 2200 are formed with predetermined pitches on the ejection opening face 2100 that faces the printing medium spaced a predetermined clearance (for example, approximately 0.5 to 2.0 mm). And along a wall surface of each of liquid passages 2400 communicating a common liquid chamber 2300 with each ejection opening 2200, the electro-thermal converting elements (exothermic resistor elements and so on) 2500 for generating the energy used for ejecting ink are arranged. In this embodiment, the head cartridge 1000 is installed on the carriage 200 under the positional relationship so that the ejection openings 2200 stand in a line in the direction which crosses a scanning direction of the carriage unit 200. Thus, the printing head 1 is constituted in that the corresponding exothermic resistor elements (hereinafter referred to as ejecting heaters) 2500 are driven (energized) based on the image signal or ejection signals to film-boil ink within the liquid passages 2400 and to eject the ink from the ejection openings 2200 by pressure of the bubbles which are generated by film-boiling.

In this embodiment, although the constitution was mentioned wherein within one printing head body, a nozzle group for ejecting the black ink, and nozzle groups for ejecting yellow, magenta, and cyan inks are provided and arranged, the invention need not be limited to this manner. The printing head having the nozzle group for ejecting the black ink may be provided independent of the printing head having the nozzle groups for ejecting the yellow, magenta, and cyan inks, and still more, the head cartridges themselves may be independent of each other. Moreover, respective head cartridge may be provided by the nozzle groups of each color which are independent of each other. The combination of the printing head and the head cartridge is not especially limited.

Moreover, the method for ejecting ink is not limited to the bubble jet type and may be a piezoelectric type or the like.

(1.2) Constitution of Control System

Secondly, a constitution of a control system for carrying out printing control of the described-above apparatus is described.

Figure 15:
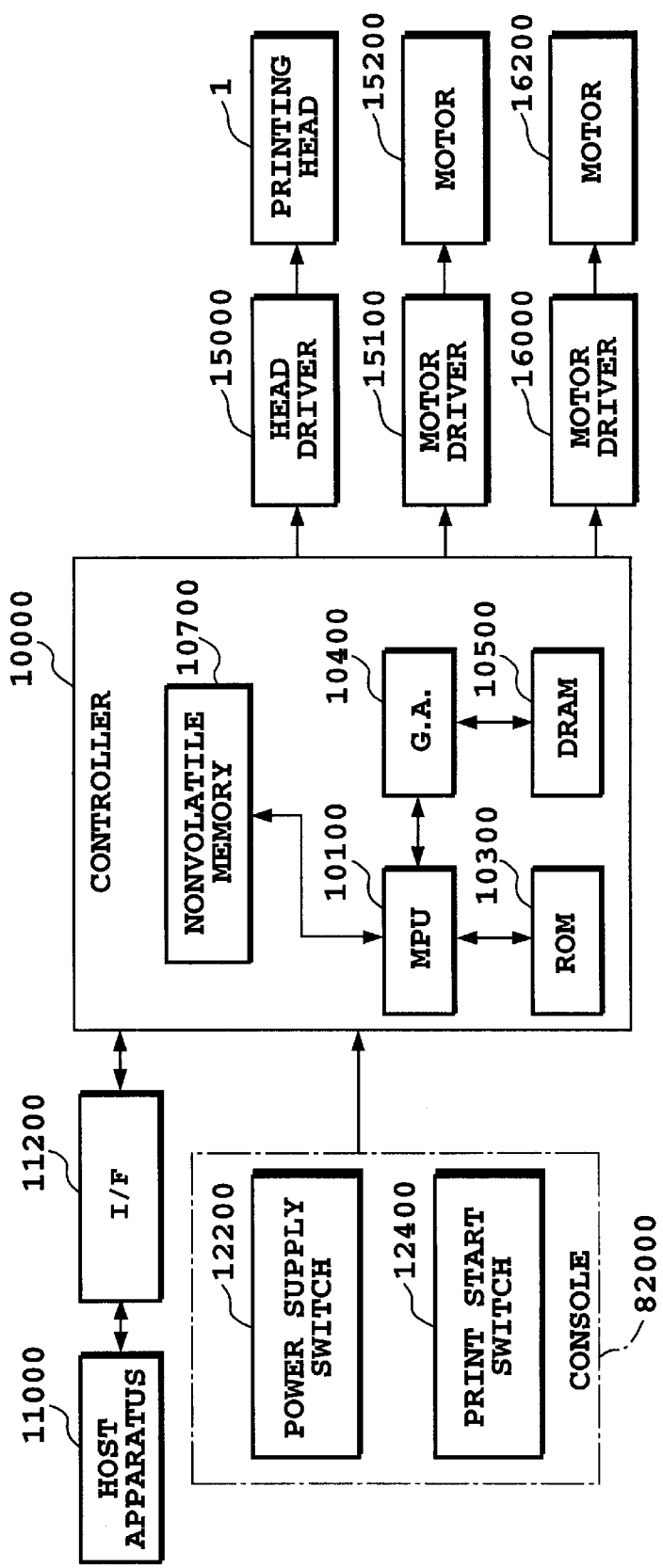
FIG. 15 is an electrical construction diagram of the printing apparatus applied to the present invention.

FIG. 15 is a block diagram showing one example of the constitution of the control system. In this drawing, a controller 10000 is a main control section and, for example, comprises an MPU 10100 of a microcomputer form, a ROM 10300 in which a program, a table required and the other fixed data are stored, a nonvolatile memory 10700 such as an EEPROM and a dynamic RAM 10500 in which various data is stored, and so on. A reference numeral 104 denotes a gate array which performs supplying control of printing data to the printing head 1, and transmission control of data between an interface (I/F) 11200, the MPU 10100 and RAM 10500 is also performed. A host apparatus 11000 is a source of supply of the image data. The image data, the other commands, a status signal or the like are transmitted to controller 10000 and are received from controller 10000 through the interface 11200.

A console 82000 has a switch group which receives indicative input by an operator, and comprises a power supply switch 12200 and a switch 12400 for indicating starting of printing.

A head driver 15000 is a driver for driving the ejection heaters 2500 of the printing head 1 according to image data and the like, and comprises a timing setting section and the like for appropriately setting driving timing (ejection timing) for the dot formation position registration. A reference numeral 15100 denotes a driver for driving a main scanning motor 15200. A reference numeral 16200 denotes a motor being used to transport (sub-scan) the printing medium and a reference numeral 16000 denotes a driver thereof.

(Embodiment 1)

FIGS. 1A to 1C are schematic views showing the printing head, and printing result on the printing medium.

In the present embodiment, sixteen ejection openings are arranged on the printing head 1, however, the number of openings is not limited to this embodiment.

The printing apparatus of the present embodiment enables full-color printing, and for this purpose, the printing head shown in FIG. 1A is provided for each of cyan (C), magenta (M), yellow (Y) and black (Bk). In the following, for simplicity of description, one of these printing heads is described as "printing head 1".

As shown in FIG. 1A, the ejection openings are numbered in the order of 1 to 16 starting from the top. The ejection opening arrangement, as shown in FIG. 1B, is equally divided in four blocks of four ejection openings. The ejection openings of Nos. 1 to 4 are a first block, the ejection openings of Nos. 5 to 8 are a second block, the ejection openings of Nos. 9 to 12 are a third block, and the ejection openings of Nos. 13 to 16 are a fourth block. Ejection operation is performed only by the second block and the fourth block, not by the first block and the third block.

Each block is divided into two groups of two ejection openings in the order from smaller ejection opening number.

Further, paper transporting amount at a time is four ejection openings, that is, 1 block.

The printing method of the present invention by such a configuration will be described with an eye on a printing region 16 on the printing medium shown in FIG. 1C.

In the first scan, the fourth block part of the printing head scans on the printing region 16. At this moment, only ejection openings of Nos. 13 and 14 perform ejection operation, and ejection openings of Nos. 15 and 16 do not perform ejection operation. That is, in this scan, only part of region on the printing region 16 in the paper transporting direction is printed.

When the printing head moves to the end of the printing region in the main scanning direction, a predetermined amount of paper transporting operation is performed.

In the second scan, the third block part of the printing head scans on the printing region 16, however, since the third block does not perform ejection operation, printing state of the printing region 16 is unchanged.

Next, similarly, after a predetermined amount of paper transporting operation is performed, the third scan is made.

In the third scan, the second block part of the printing head scans on the printing region 16, at this moment, only ejection openings of Nos. 7 and 8 perform ejection operation, and ejection openings of Nos. 5 and 6 do not perform ejection operation. That is, in this scan, only part of region (remaining region) on the printing region 16 in the paper transporting direction is printed.

Next, similarly, after a predetermined amount of paper transporting operation is performed, the fourth scan is made.

In the fourth scan, the first block part of the printing head scans on the printing region 16, however, since the first block does not perform ejection operation, printing state of the printing region 16 is unchanged.

In the printing region 16, partial region of two rasters each in the paper transporting direction, that is, in the raster direction is printed in the first scan and the third scan. Therefore, in spite of the paper transporting pitch of four rasters, the printing result is a bind pitch of two rasters each. Since printing is made with a short bind pitch of two rasters, which is imperceptible to human eyes, even if banding artifacts occur, it can be suppressed to an imperceptible level. For example, it is confirmed that in an image printed with a bind pitch of less than about 75 dpi (dot per inch), that is, about 3.5 mm, banding artifacts are difficult to be perceptible.

As described above, with the present embodiment, printing is possible with the same number of scans as in the ordinary multi-scanning printing, so printing is possible without reduction of throughput.

As described above, only the second block and the fourth block perform ejection operation, and in each of these blocks only two ejection openings perform ejection operation simultaneously. This is possible by providing masking print data of pixels corresponding to the respective ejection openings.

FIGS. 2A to 2D are views showing masking patterns to the printing region 16.

In the drawings, each mask shows a pixel corresponding to each ejection opening, 'mask 1' to 'mask 4' shown in FIGS. 2A to 2D correspond to first to fourth scans. In the drawings, a shaded part 21 and a white part 23 are pixels corresponding to non-printing ejection openings, and a black circle part 22 is a pixel corresponding to an ejection opening concerned to dot printing, that is, performing ink ejection.

Further, with reference to the mask pattern, in the first scan, parts corresponding to the ejection openings of Nos. 5 and 6 of the second block and the ejection openings of Nos. 13 and 14 of the fourth block are printed, and other pixels are non-printed. In the second scan, parts corresponding to the ejection openings of Nos. 7 and 8 of the second block and the ejection openings of Nos. 15 and 16 of the fourth block are printed, and other pixels are non-printed. In the third scan, parts corresponding to the ejection openings of Nos. 7 and 8 of the second block and the ejection openings of Nos. 15 and 16 of the fourth block are printed, and other pixels are non-printed. In the fourth scan, parts corresponding to the ejection openings of Nos. 5 and 6 of the second block and the ejection openings of Nos. 13 and 14 of the fourth block are printed, and other pixels are non-printed.

By repeatedly using such 'mask 1' to 'mask 4' having the above patterns, the printing result with fine bind pitch as shown above can be obtained.

The mask pattern is not limited to the above shown type, but can be flexibly set according to the number of scans and bind pitch.

Further, for the printing region 16, after performing printing in the first scan, printing is not performed in the second scan, and printing is performed again in the third scan. Therefore, since the dot deposited in the first scan is sufficiently fixed to the printing medium during the second scan, the dot deposited in the third scan is difficult to bleed even when disposed adjacently. That is, since printing is performed every other scan, the deposited ink is given a suitable time for fixing to the printing medium, thereby suppressing bleeding.

Still further, in the above-described embodiment, the printing head is divided into four blocks of four ejection openings, and only the second block and the fourth block perform ejection operation. However, the present invention is not limited to this division method, but can be flexibly set according to the bind pitch or the like. For example, when an ejection opening of defective ejection is found in the factory inspection before delivery, by setting the block division so that the defective ejection opening is always included in a non-printing block, the printing head can be delivered without any problem in operation.

Yet further, in the case of a normal printing head not including a defective ejection opening, not only the second block and fourth block perform ejection operation such as the above embodiment, but also the ejection openings may be divided into two groups which are a group of the first block and the third block and a group of the second block and the fourth block, so that on every time of completion of data printing, the group for performing ejection operation may be replaced for obtaining uniform operation frequency of both groups. Yet further, integrated number of scanning times may be calculated by dot counting or the like to each ejection opening of the second block and fourth block, when the integrated count exceeds a predetermined value, the blocks for performing ejection operation may be replaced by the first block and third block. The predetermined value may be determined according to durability of the printing head. As described above, by changing the ejection openings performing ejection operation at constant intervals, all ejection openings can be uniformly used, and durability of the printing head is increased.

(Embodiment 2)

In the above embodiment 1, ejection openings used for printing and ejection openings not used are determined in the printing head, however, in the present embodiment, a configuration where only the ejection openings used for ejection are provided in the printing head will be described.

Figure 3A:
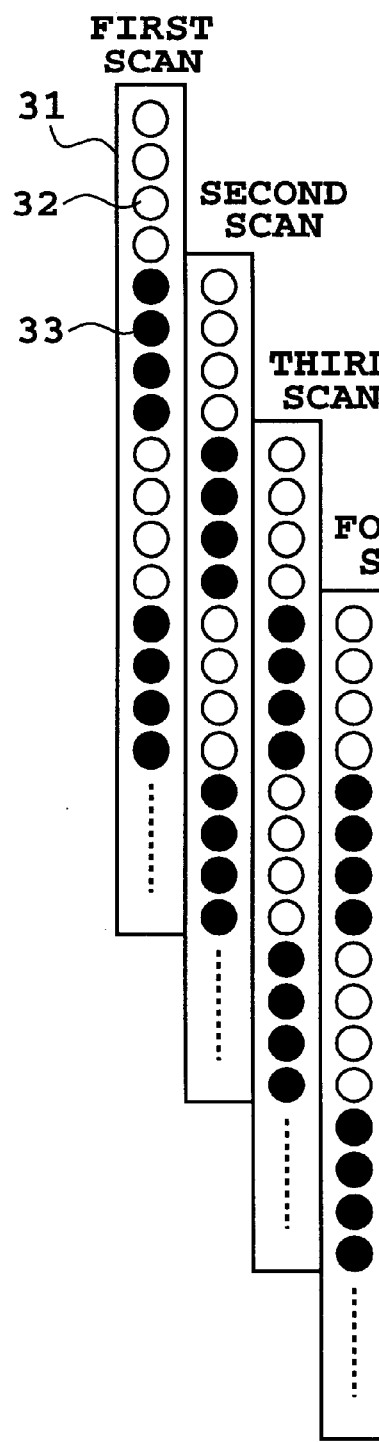
FIGS. 3A and 3B are explanatory views respectively showing driving methods of the printing head used in the first embodiment and a second embodiment of the present invention.
Figure 3B:
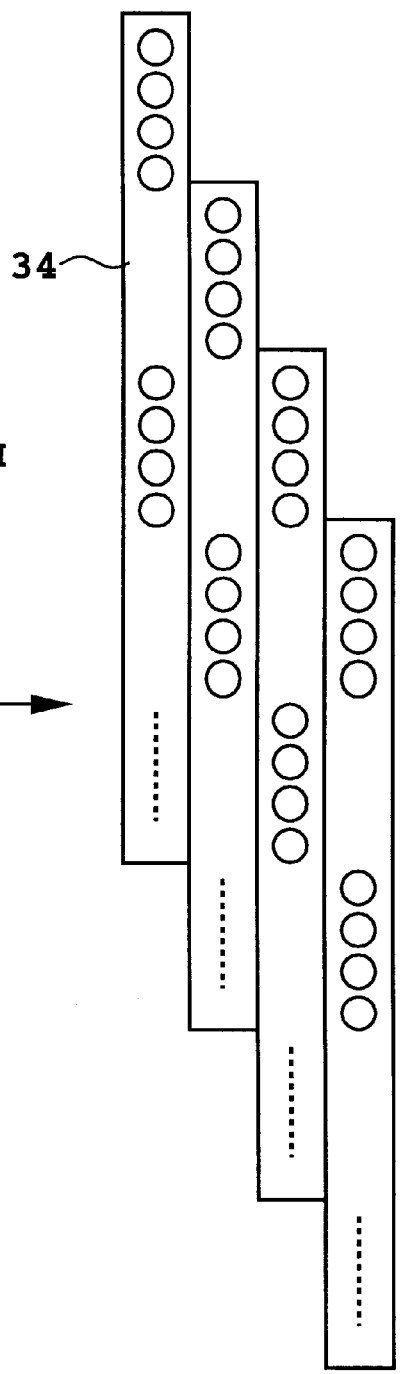

FIG. 3A shows the printing head in the embodiment 1, and FIG. 3B shows the printing head in the present embodiment.

In both the embodiment 1 and the present embodiment, the paper transporting pitch is four ejection openings, however, it is not limited to this, and it is sufficient when the bind pitch is less than the visual characteristics.

In the above embodiment 1, the printing head is divided into blocks of four ejection openings, and numbered from the top as the first block, second block, and so on. And the printing head is divided into blocks used for printing and blocks not used for printing at every other block. However, in the present embodiment, parts corresponding to blocks (that is, even numbered blocks) not used for printing operation in the embodiment 1 are not provided with ejection openings. As shown in FIG. 3B, by the construction where ejection openings are not provided at constant intervals, compared with the printing head of the embodiment 1, formation of liquid passage, the electro-thermal converting element and wiring therefor can be omitted, thereby further suppressing the manufacturing cost of the printing head.

FIGS. 4A and 4B are views showing the printing result by the printing head of the above construction.

A printing head 41, as described in FIG. 3B, has a structure where the ejection opening is not provided at every other block. When printing is performed using the mask pattern described in FIGS. 2A to 2D by the printing head 41 of this structure, in the predetermined printing region 42, as shown in the drawing, in spite of the paper transporting amount of four ejection openings at a time, image can be formed with a short bind pitch of two bind pitches same as in the embodiment 1.

(Embodiment 3) In the embodiment 1, a configuration where a block performing ejection operation and a block not performing ejection operation are provided in alternation is described. In the present embodiment, a configuration where all blocks are used for printing at every scan is described.

Figure 5B:
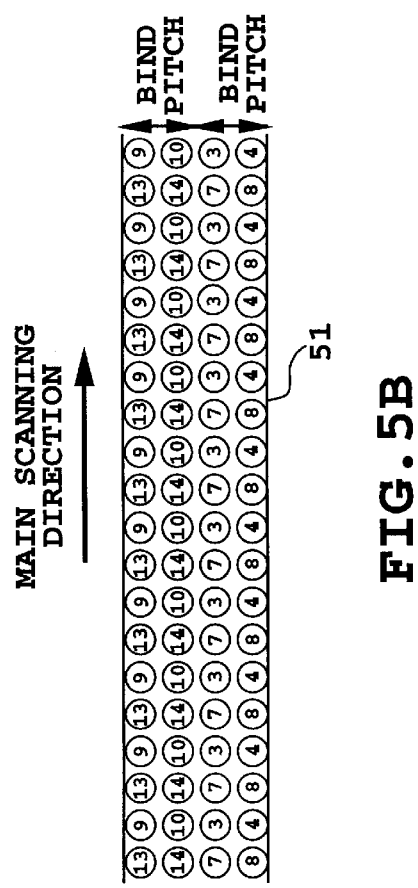
FIGS. 5A and 5B are schematic views showing a printing head driving method and a printing result on the printing medium in a third embodiment of the present invention.
Figure 5A:
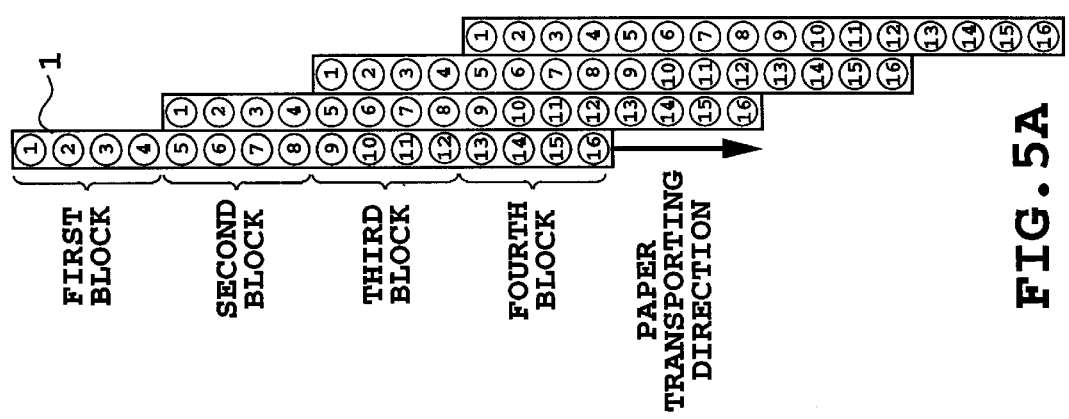

FIGS. 5A and 5B are schematic views respectively showing a printing head and printing result on the printing medium in the present embodiment.

With the printing head 1 same as in the embodiment 1, the printing head is divided into blocks of four ejection openings, and numbered from the top as the first block, second block, third block, and fourth block.

As shown in printing region 51 as part of the printing result, in the first scan, using only the ejection openings of Nos. 13 and 14, dots are deposited at every other 1 pixel in the main scanning direction. In the printing region 51, only the ejection openings of the above ejection opening Nos. are used, in the actual scanning, an ejection method determined by 'mask 1' to 'mask 4' is used (see FIGS. 6A to 6D).

In the second scan, in the main scanning direction, to pixels adjacent to dots deposited in the foregoing first scan, dots are deposited using only the ejection openings of the ejection openings of Nos. 9 and 10.

In the third scan, using only the ejection openings of Nos. 7 and 8, dots are deposited every other pixel in the main scanning direction.

In the fourth scan, in the main scanning direction, to pixels adjacent to dots deposited in the third scan, dots are deposited using only the ejection openings of Nos. 3 and 4.

FIGS. 6A to 6D show the mask patterns of the present embodiment.

Each box in the drawing indicates a pixel corresponding to each ejection opening, and 'mask 1' to 'mask 4' shown in FIGS. 6A to 6D correspond to the first to the fourth scans. In the drawing, a white part 23 is a pixel corresponding to an ejection opening which does not perform printing, and a black circle part 22 is a pixel corresponding to an ejection opening which performs printing.

Using such the mask patterns, the above-described dot deposition pattern can be achieved.

As described above, by performing printing using all the ejection openings, ejection openings in the printing head can be uniformly utilized.

(Embodiment 4)

In the embodiments 1 and 2, by using mask patterns in which one block with four ejection openings are divided into two groups of two ejection openings each, and respective groups perform ejection operation in alternation at every one scan, a printing result of a bind pitch of two rasters is obtained. However, the mask patterns are not limited to the above, but may be other patterns.

Further, in a given region of the printing medium, a part previously deposited with a dot becomes a fiber of high hydrophilicity as compared with a part not deposited as yet with a dot. Therefore, when a position adjacent to a previously deposited dot is deposited with a further dot, an ink drawing phenomenon is generated. That is, ink of the latterly deposited dot is drawn to the previously deposited dot side, generating bleeding. Mask patterns effective for preventing such an ink drawing phenomenon will be described in the present embodiment.

In the present embodiment, a printing head having sixteen ejection openings same as those used in the embodiment 1 arranged on a line is used.

FIGS. 7A to 7C are views for explaining the printing head of the present embodiment and driving method thereof.

The printing head 1, same as in the embodiment 1, is divided into four blocks of four ejection openings each, of which only the second block and the fourth block perform ejection operation.

Further, paper transporting amount at a time is for four ejection openings, that is, for one block.

In a region 71 as part of printing result printed by the printing head of such the configuration, a number of ejection openings forming respective dots are correspondingly shown.

FIGS. 8A to 8D are views showing the mask patterns of the present embodiment.

In the drawings, one box corresponds to one pixel, a shaded part 21 and a white part 23 are pixels corresponding to non-printing ejection openings, and a black circle part 22 is a pixel corresponding to an ejection opening printing a dot.

The 'mask 1' corresponds to printing of the first scan, the 'mask 2' to the second scan printing, the 'mask 3' to the third scan printing, and the 'mask 4' to the fourth scan printing.

In respective mask patterns, (I) and (II) form a pair, so that pixels deposited with dots are arranged in a checkered pattern by (I) and (II).

Figures 9A, 9B:
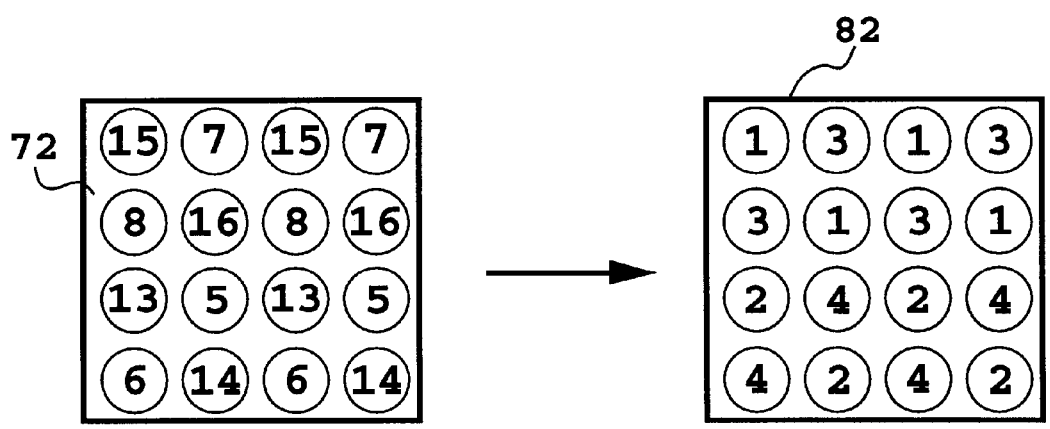
FIGS. 9A to 9B are an enlarged view of part of the printing result shown in FIG. 7C and an explanatory view of scanning numbers.

FIGS. 9A and 9B are enlarged views of a part 72 of a region 71 in FIG. 7C printed by the above mask pattern.

FIG. 9A shows the ejection opening numbers depositing dots. In the first scan, ejection openings of Nos. 15 and 16 perform ejection operation. In the second scan ejection openings of Nos. 13 and 14 perform ejection operation. In the third scan ejection openings of Nos. 7 and 8 perform ejection operation, and in the fourth scan ejection openings of Nos. 5 and 6 perform ejection operation. Therefore, for easily understanding which dot is formed by which scan, FIG. 9B shows a scan number corresponding to each dot.

FIGS. 10A to 10D explain the state of dot deposition in each scan with the passage of time.

By depositing respective dots in a checkered pattern, the ink drawing phenomenon can be avoided. The reason thereof will be described in detail with reference to FIGS. 10A to 10D.

Figure 10A:
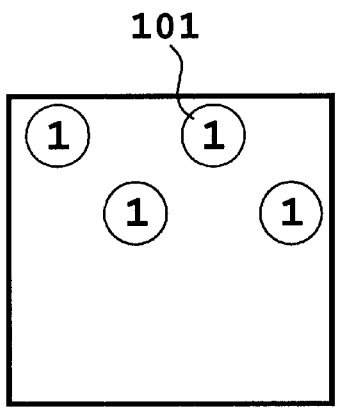
FIGS. 10A to 10D are views showing printing results per scan.

In the first scan, as shown in FIG. 10A, the upper half of the region is deposited with dots 101 in a checkered pattern, since the respective dots are not adjacent to each other, the ink drawing phenomenon is not generated.

Figure 10B:
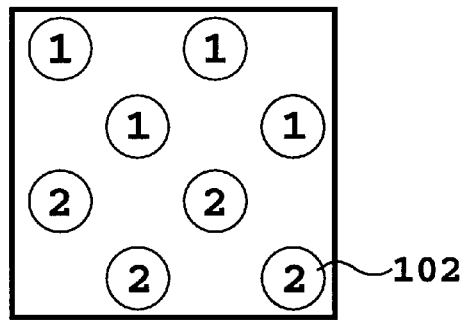

Also in the second scan shown in FIG. 10B, since respective deposited dots 102 are not adjacent to each other, the ink drawing phenomenon is not generated.

Figure 10C:
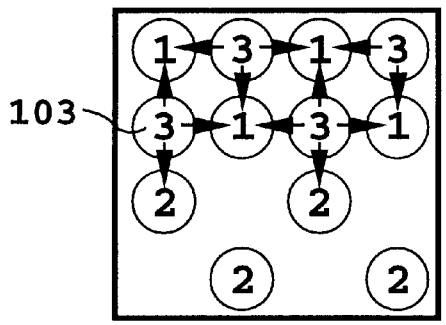

In the third scan, as shown in FIG. 10C, dots 103 are deposited in a checkered pattern at positions reverse to the dots in the upper half of the region in the first scan. The deposited dots 103 are respectively adjacent to the dots deposited in the first scan and the second scan. However, ink of the dots 103 is simultaneously drawn from both sides of the opposite directions, and the vector sum of respective action forces is zero, resulting in a suppressed drawing phenomenon.

Figure 10D:
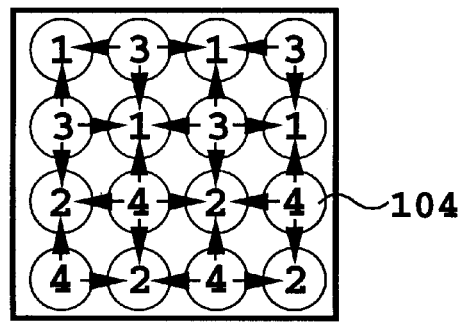

Also in the fourth scan as shown in FIG. 10D, dots 104 are similarly deposited in the lower half of the region in a checkered pattern, same as in the state of the dots 103, the vector sum of ink drawing forces is zero, thus suppressing the drawing phenomenon.

As described above, by forming the mask pattern in a checkered pattern, ink drawing phenomenon can be suppressed and, as a result, generation of stripes is suppressed.

The mask pattern can be flexibly changed according to the total number of scans, the bind pitch, and the like.

(Processing Sequence)

A processing sequence for performing printing operation of the above respective embodiments 1 to 4 will be described.

Figure 11:
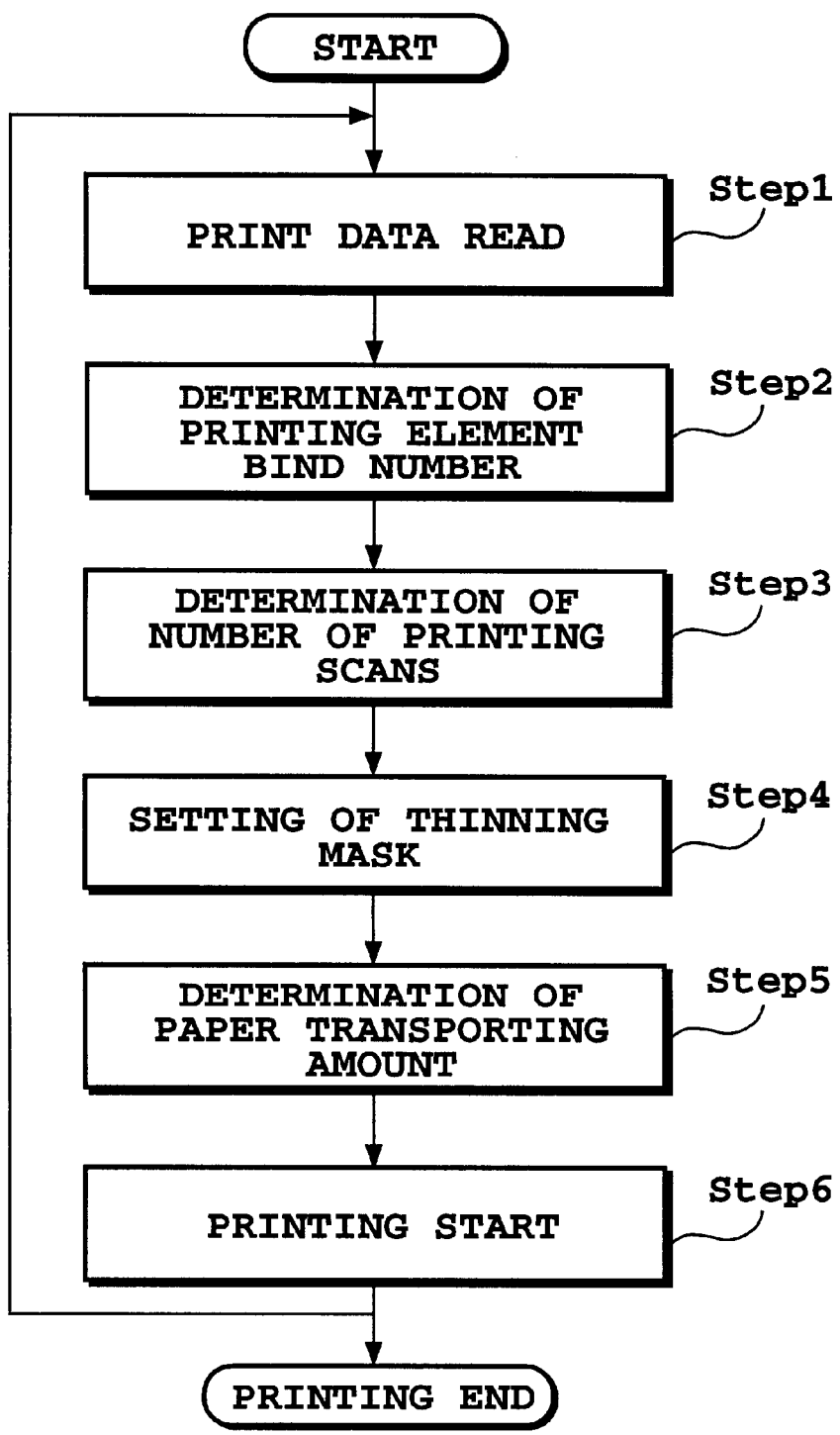
FIG. 11 is a flow chart showing an example of printing procedure applied the first to fourth embodiments.
Figure 12:
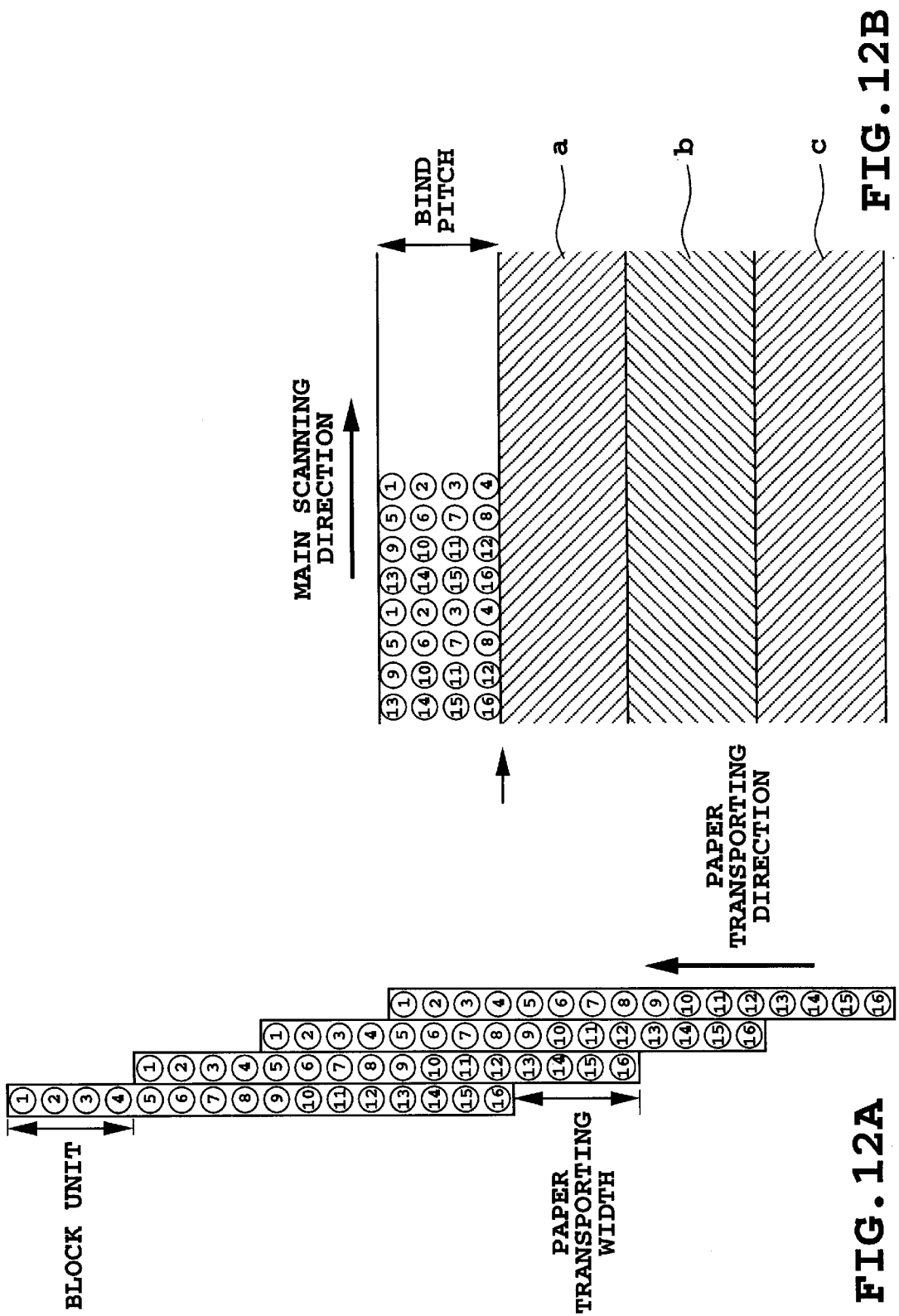
FIGS. 12A and 12B are views showing a prior art multi-scanning scanning method.

FIG. 11 is a flow chart showing a processing sequence.

First, when print data is transmitted from the host apparatus 11000 (FIG. 15) or the like, the transmitted data is read (Step 1). The print data includes information necessary for carrying out the printing operation such as image data to be printed, information of the printing medium to be printed, printing method information, and the like.

Next, a bind number of the ejection openings is determined from the read print data (Step 2). Here, it is set so that the bind pitch is below the visual characteristics. For example, in the printing head having 32 ejection openings at 600 dpi intervals, the ejection openings are bound in units of $2^k$ (in this case k is an integer of $1 \leq k \leq 5$) according to the printing mode set (such as a high speed mode for printing speed in preference, a high-resolution mode for high image quality in preference, a normal mode, and the like), and the ejection opening arrangement in the printing block is divided. For example, in a printing head provided with a part of no ejection opening at every other interval as described in the embodiment 2, a predetermined bind pitch is employed.

Next, the number of print scans is determined on the basis of the bind pitch determined in Step 2. (Step 3)

Further, according to the number of print scans determined in Step 3, a thinning mask is set (Step 4).

Next, the paper transporting amount according to the mask pattern and bind pitch is determined (Step 5). Here, in the case that the block size is fixed, an even paper transporting amount, that is, a paper transporting amount corresponding to the number of ejection openings included in the block is used. However, if the block size is variable, that is, for example, since the number of ejection openings included in the block can be variably set according to the mask pattern or bind pitch, a paper transporting amount for the set ejection openings can be set.

After these operation conditions are determined, printing operation is started (Step 6). When all of the read image data is printed, a checking is made as to whether or not a further print data is inputted. When inputted, the processing returns to Step 1, where the bind number, the print scan number, the mask pattern, and the paper transporting amount are set again. On the other hand, when not inputted, the printing operation is ended.

By using the printing apparatus and the printing method according to the present invention, since printing elements performing printing in one block by one scan are part of one block, the formed bind pitch is less than the paper transporting width. Only the bind pitch can be reduced without increasing the number of scans. Therefore, when the bind pitch is set below the visual characteristics, an image with imperceptible banding artifacts can be formed by a reduced number of scans.

Further, since the mask pattern is formed in checkered pattern, ink drawing action forces generated from respective dots deposited by previous scan adjacent to dots deposited by latter scan are respectively set off, and the ink drawing phenomenon can be suppressed.

Still further, by providing a printing element block performing printing operation and a block not performing printing operation in alternation, and placing the printing defective printing element at the printing element block side not performing printing operation, occurrence of defective product can be reduced.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for performing printing using a printing head having a plurality of printing elements arranged thereon, comprising:

scan means for scanning the printing head relative to a printing medium in a direction different from the arrangement direction of said printing elements;

transport means for transporting the printing medium relative to the printing head by an amount corresponding to a printing element arrangement length in a block of printing elements, said length being obtained by dividing said plurality of printing elements into a plurality of blocks; and control means for controlling said scan means to perform scanning of a plurality of times and interposing the transporting by said transport means between each scanning, and for completing printing on a region of the printing medium corresponding to the respective plurality of blocks, wherein said control means controls a printing operation on a partial region as a part of said region in said transporting direction in each said scanning of the plurality of times, and completes the printing of said region corresponding to the printing element arrangement length in said block.

2. The printing apparatus as claimed in claim 1, further comprising:

means for determining a number of printing elements of said partial region to be bound according to a printing mode; and means for determining a number of scans according to said printing mode.

3. The printing apparatus as claimed in claim 1, wherein a pitch in said transporting direction of said partial region is less than a predetermined pitch possible for visual perception of an unevenness.

4. The printing apparatus as claimed in claim 3, wherein said predetermined pitch is 3.5 mm.

5. The printing apparatus as claimed in claim 1, wherein said control means controls the printing operation on said partial region by providing masking print data corresponding to said printing elements.

6. The printing apparatus as claimed in claim 5, wherein a mask pattern in said masking is set according to the bind number of said printing elements of said partial region and/or said number of scans.

7. The printing apparatus as claimed in claim 5, wherein a mask pattern in said masking is a mask pattern in which pixels adjacent at least in said scanning direction are not printed simultaneously. #

8. The printing apparatus as claimed in claim 7, wherein said mask pattern is a mask pattern in which pixels adjacent in said scanning direction and arrangement direction of said printing elements are not printed simultaneously.

9. The printing apparatus as claimed in claim 1, wherein said printing head has blocks formed of a predetermined number of printing elements disposed at predetermined intervals.

10. The printing apparatus as claimed in claim 5, wherein said control means performs masking to printing data corresponding to the printing elements in the blocks of predetermined intervals among said blocks including the predetermined number of printing elements on said printing head.

11. The printing apparatus as claimed in claim 10, wherein said control means changes setting of the blocks to be masked according to frequency of use of printing elements.

12. The printing apparatus as claimed in claim 1, wherein said printing head is an ink jet head for ejecting an ink to said printing medium.

13. The printing apparatus as claimed in claim 12, wherein said ink jet head has a heat generation element as an electro-thermal converting element for heating ink and performs printing by ejecting ink by a generation pressure of a bubble generated in said ink.

14. A printing method for performing printing using a printing head having a plurality of printing elements arranged thereon, comprising:

a scan step of scanning the printing head relative to a printing medium in a direction different from the arrangement direction of said printing elements;

a transport step of transporting the printing medium relative to said printing head by an amount corresponding to a printing element arrangement length in a block of printing elements, said length being obtained by dividing said plurality of printing elements into a plurality of blocks; and a control step of controlling said scan step to perform scanning of a plurality of times and interposing the transporting in said transport step between each scanning, and of completing printing on a region of the printing medium corresponding to the respective plurality of blocks, wherein said control step controls a printing operation on a partial region as a part of said region in said transporting direction in each of said scanning of the plurality of times, and completes the printing of said region corresponding to the printing element arrangement length in said block.

15. The printing method as claimed in claim 14, further comprising the steps of:

determining a bind number of printing elements of said partial region to be bound according to a printing mode; and determining a number of scans according to said printing mode.

16. The printing method as claimed in claim 14, wherein a pitch in said transporting direction of said partial region is less than a predetermined pitch possible for visual perception of an unevenness.

17. The printing method as claimed in claim 14, wherein said predetermined pitch is 3.5 mm.

18. The printing method as claimed in claim 14, wherein said control means controls the printing operation on said partial region by providing masking print data corresponding to said printing elements.

19. The printing method as claimed in claim 18, wherein a mask pattern in said masking is set according to the bind number of said printing elements of said partial region and/or said number of scans.

20. The printing method as claimed in claim 18, wherein a mask pattern in said masking is a mask pattern in which pixels adjacent at least in said scanning direction are not printed simultaneously.

21. The printing method as claimed in claim 20, wherein said mask pattern is a mask pattern in which pixels adjacent in said scanning direction and arrangement direction of said printing elements are not printed simultaneously.

22. The printing method as claimed in claim 14, wherein said printing head has blocks formed of a predetermined number of printing elements disposed at predetermined intervals.

23. The printing method as claimed in claim 18, wherein said control step performs masking to printing data corresponding to the printing elements in the blocks of predetermined intervals among said blocks including the predetermined number of printing elements on said printing head.

24. The printing method as claimed in claim 23, wherein said control step changes setting of the blocks to be masked according to frequency of use of printing elements.

25. The printing method as claimed in claim 14, wherein said printing head is an ink jet head for ejecting an ink to said printing medium.

26. The printing method as claimed in claim 25, wherein said ink-jet head has a heat generation element as an electro-thermal converting element for heating ink and performs printing by ejecting ink by a generation pressure of a bubble generated in said ink.

* * * * *

UNITED STATES PATENT AND TRADEMARK OFFICE
CERTIFICATE OF CORRECTION

PATENT NO.    : 6,334,659 B1
DATED         : January 1, 2002
INVENTOR(S)   : Maeda et al.

It is certified that error appears in the above-identified patent and that said Letters Patent is hereby corrected as shown below:

Column 2,
Line 63, "surf ace" should read -- surface --.

Column 4,
Line 34, "schematic" should read -- are schematic --.

Column 9,
Line 60, "(Embodiment 3) In" should read -- (Embodiment 3) -- and "In" should begin a new paragraph.

Column 13,
Line 46, "#" should be deleted.

Signed and Sealed this

Twenty-first Day of May, 2002

Attest:

*Attesting Officer*

JAMES E. ROGAN
*Director of the United States Patent and Trademark Office*